(No Model.)
2 Sheets—Sheet 1.
R. W. McKEE.
CAR BRAKE.
No. 531,550.
Patented Dec. 25, 1894.
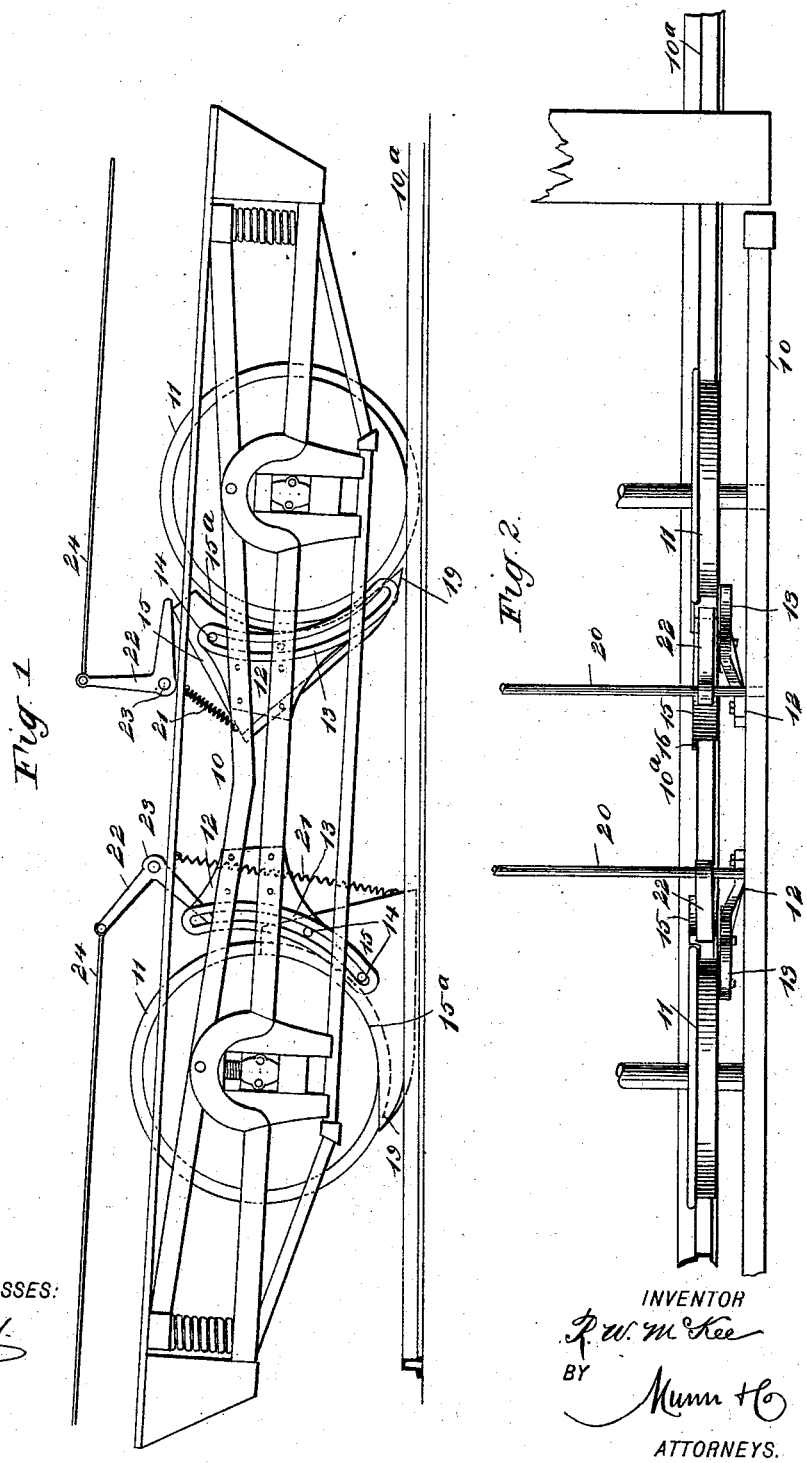
WITNESSES:
INVENTOR
R. W. McKee
BY
Munn & Co
ATTORNEYS.

(No Model.) 2 Sheets—Sheet 2.
R. W. McKEE.
CAR BRAKE.
No. 531,550. Patented Dec. 25, 1894.
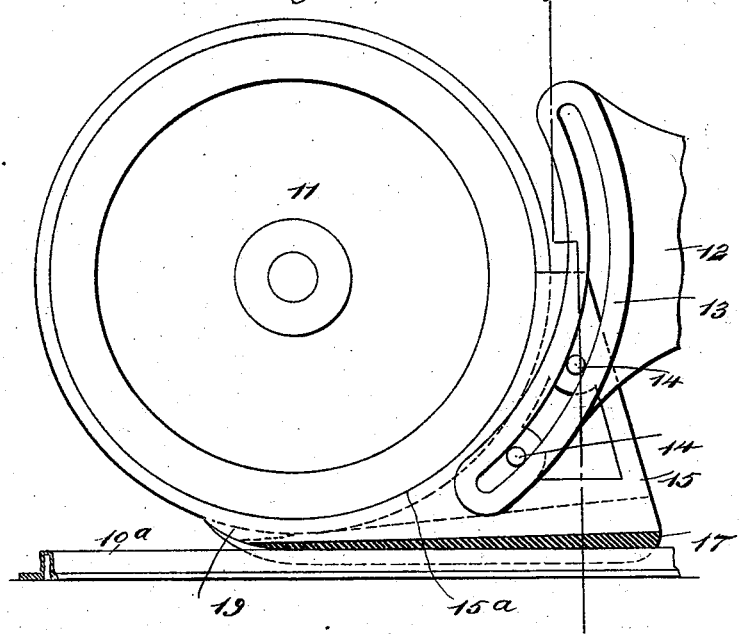
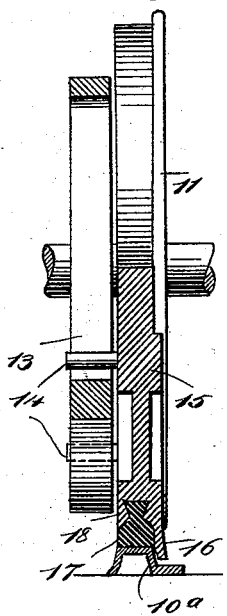
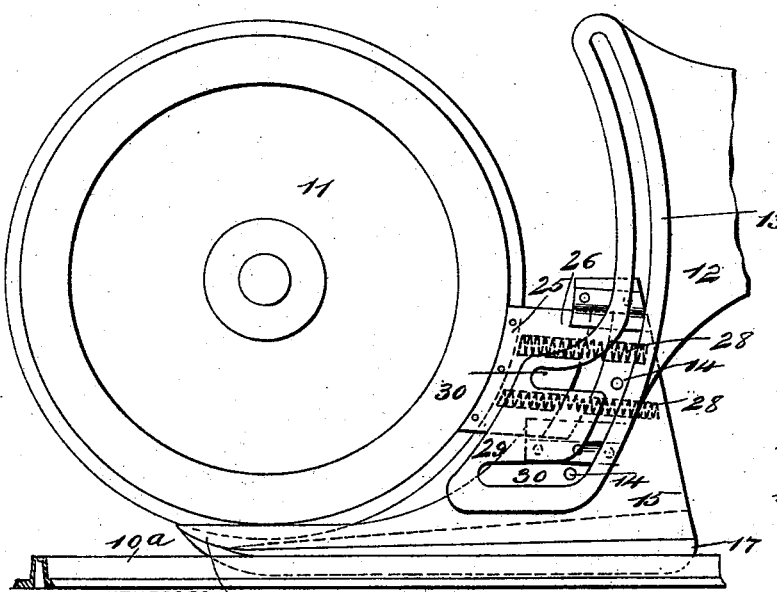
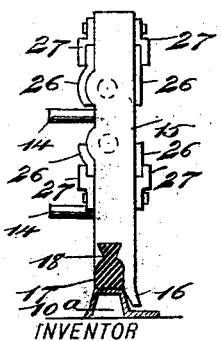

UNITED STATES PATENT OFFICE.

RUSSELL WALLACE McKEE, OF CLIFTON, NEW JERSEY.

CAR-BRAKE.

SPECIFICATION forming part of Letters Patent No. 531,550, dated December 25, 1894.

Application filed February 7, 1894. Serial No. 499,348. (No model.)

*To all whom it may concern:*

Be it known that I, RUSSELL WALLACE MC-KEE, of Clifton, in the county of Passaic and State of New Jersey, have invented a new and improved Emergency-Brake, of which the following is a full, clear, and exact description.

My invention relates to improvements in car brakes; and the object of my invention is to produce what I term an emergency brake, which is adapted to be used in connection with other brakes, and particularly on the trucks of trolley and cable cars, although it may be used in connection with any cars.

A further object of my invention is to produce a very cheap, simple and strong brake, which may be instantly operated with the expenditure of very little physical effort, which may be conveniently applied to any ordinary truck, which when applied to the wheels instantly stops the car by lifting the wheels from the track so as to deprive them of all power, which is drawn back automatically to position after the car is stopped, which is arranged in such a way as to have no strain on the truck frame, which does not injure the truck frame in case the brake is broken or torn away, which is provided with a spring buffer for use on heavy cars, adapted to absorb the shock of the sudden stopping of the car so that it will not be disagreeably noticed by passengers, and which enables the car to be stopped so suddenly that it is not necessary to have the car provided with safety fenders to prevent people from being run over.

To these ends my invention consists of certain features of construction and combinations of parts, which will be hereinafter described and claimed.

Reference is to be had to the accompanying drawings, forming a part of this specification, in which similar figures of reference indicate corresponding parts in all the views.

Figure 1 is a side elevation of a car truck provided with my improved emergency brake, one brake shoe being shown as applied to the wheel of the car. Fig. 2 is a broken plan view of the same. Fig. 3 is a broken enlarged side elevation, partly in section, of my improved brake as applied to a wheel and rail. Fig. 4 is a vertical section on the line 4—4 of Fig. 3. Fig. 5 is a side elevation of a slightly modified form of the brake, as applied to a car, the shoe being shown with a spring buffer to absorb the shock; and Fig. 6 is a detail rear elevation of the modified form of shoe.

The truck frame 10 may be of any usual construction, and it is provided with the customary wheels 11 adapted to run on the track rails $10^a$. On the truck frame adjacent to the wheels, are guides 12, there being one for each wheel, and the guides are formed with a curved slot or guideway 13, the concave side being placed nearest the wheel and the radius of the curved guide being greater than that of the wheel, while its center is above the wheel center. The curved guides 13 receive the pins 14 of the shoe 15, which is arranged at one side of the guide, there being a shoe for every guide, and each shoe is of a generally triangular shape having its edge $15^a$ next the wheel shaped to fit snugly thereon, and this bearing face of the shoe should be about equal to one-fourth the perimeter of the wheel, so that it will permit the wheel to be raised from the track without danger of surmounting the shoe. The shoe is provided with a substantially flat bottom and on one edge of the bottom is a flange 16, which overlaps the rail $10^a$ when the shoe is in position to brake the wheel, and the flange serves as a guide which prevents the displacement of the shoe. In the bottom of the shoe is a rubber foot 17 which covers the entire bottom surface, this foot being dovetailed into the shoe, as shown best at 18 in Figs. 4 and 6, and it is of a wedge shape, as illustrated in Fig. 3, being thinnest at its front end, and consequently the pressure of the wheel on the shoe increases the hold of the shoe on its foot and increases the friction of the foot on the rail. The front edge of the shoe is thinned and pointed, as shown at 19, so that the shoe may readily enter between the wheel and the track, and as soon as the wheel nips the shoe, the friction causes the shoe to hug the rail and the wheel runs upon the shoe and is lifted entirely off the track, so that the car is instantly stopped.

By reference to Fig. 1, it will be seen that the shoes are arranged on the inner or adjacent edges of the truck wheels, so that two shoes will act when the car is going in either direction. The opposite shoes are connected by cross bars 20, so that they are sure to both act in unison. Each shoe is normally raised by a spiral spring 21, which is attached to the heel of the shoe and to a portion of the truck frame above it, so that when the grip of the wheel is released from the shoe, the tension of the spring and the recoil of the rubber foot causes the shoe to be automatically raised.

Any suitable means may be employed for throwing the shoe downward into contact with the rail and wheel, and as illustrated a bell crank 22 is arranged above each shoe, this crank being pivoted at its elbow, as shown at 23, and having one end or arm resting on the top of the shoe, while the other connects with a rod 24 adapted to be worked by a lever on the car, in substantially the same manner that ordinary brake rods are worked.

It will be seen that when the rod 24 is pulled, the bell crank 22 is tilted and the shoe forced downward, so as to cause its point 19 to be nipped between the wheel and the rail, after which the wheel runs up on the shoe and the shoe hugs the track in the manner already described. For use on heavy cars, a spring buffer is preferably employed, as illustrated in Figs. 5 and 6. As here shown, each shoe 15 is provided with a spring buffer 25 which projects forward from the concave edge of the shoe, so as to strike a car wheel before the wheel comes into contact with the body portion of the shoe, this buffer having parallel arms 26 which straddle the shoe 15 and slide in angle guides 27 on the shoe, the buffer being pressed normally forward by stiff spiral springs 28 which are held in sockets in the shoe and in the buffer.

It follows that when the shoe is applied to the wheel and rail, as specified, the impact of the wheel on the buffer pushes the latter against the tension of the springs 28 and finally the whole face of the shoe is brought to bear on the wheel, thus stopping the car. When the buffer is used, the lower end of the guideway 13 is widened, as shown at 29, to form a suitable support for the buffer, and the widened portion of the guide has lateral slots 30 to receive the pins 14 of the shoe 15.

Having thus described my invention, I claim as new and desire to secure by Letters Patent—

1. The combination with a truck provided with guides having curved slots, of shoes approximately triangular in shape, having one edge curved to fit upon the wheels, and provided with a flange projecting from one edge of the bottom and with pins projecting from the sides thereof and working in the curved slots, wedge shaped rubber feet covering the bottom surface of the shoes, springs for holding the shoes elevated, and means for forcing the shoes in contact with the rails, substantially as described.

2. The combination with a truck provided with curved guideways, of shoes provided with pins working in the guideways, springs secured to the shoes and to the truck frame, and bell cranks arranged above the shoes and having one arm engaging the shoes, the other being adapted to be connected with an operating lever, substantially as described.

3. The combination with a truck provided with curved guideways having lateral extensions at their lower ends, of shoes having pins working in the guideways, spring pressed buffers in the shoes, and means for raising and lowering the shoes, substantially as described.

4. The combination with a truck provided with curved guideways having lateral extensions at their lower ends, of spring pressed shoes having rubber feet and provided with pins working in the guideways, and means for depressing the shoes, substantially as described.

RUSSELL WALLACE McKEE.

Witnesses:
 WARREN B. HUTCHINSON,
 C. SEDGWICK.